Inventors:
Fred'k E. Hummel
John J. Noeth

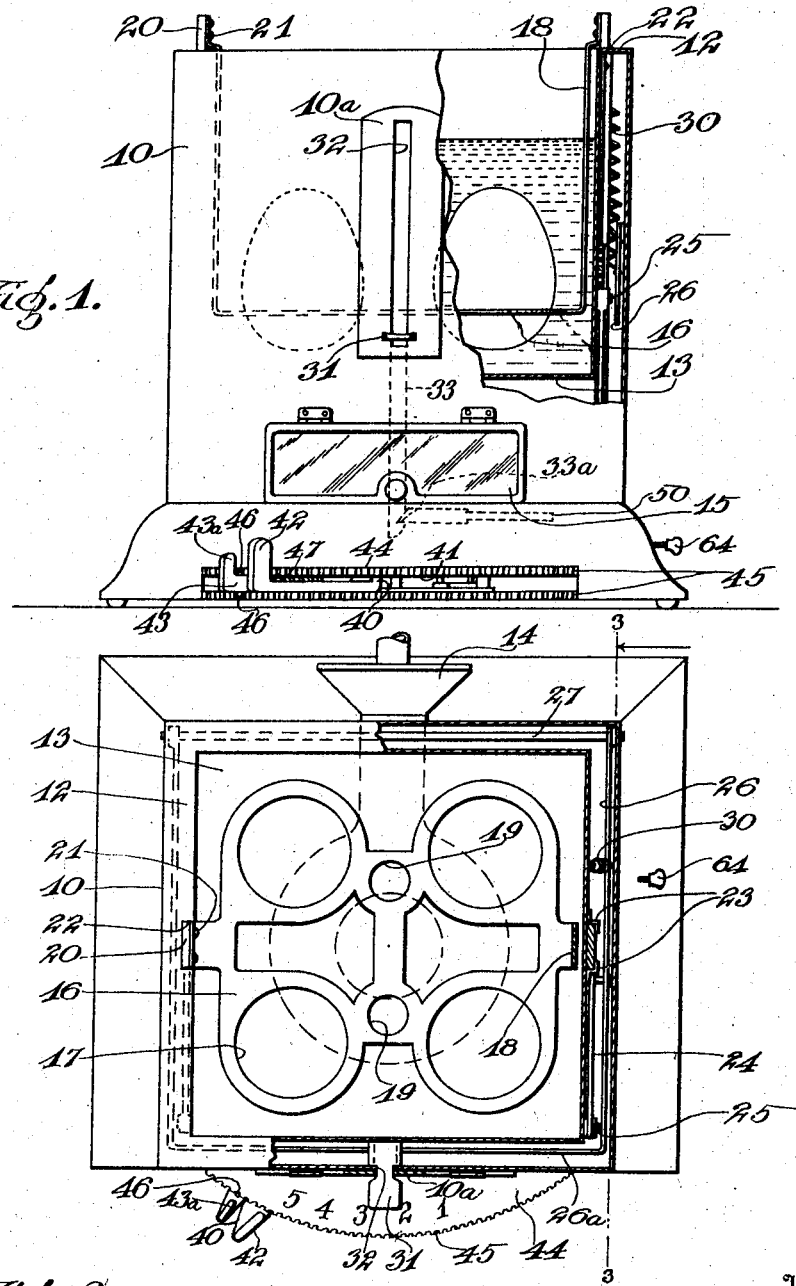

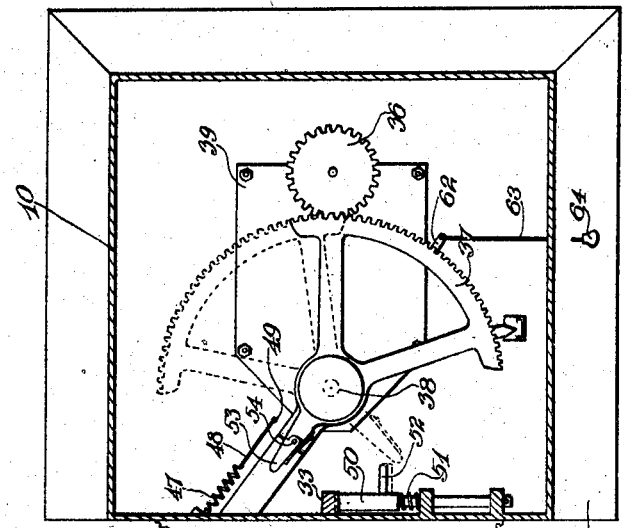
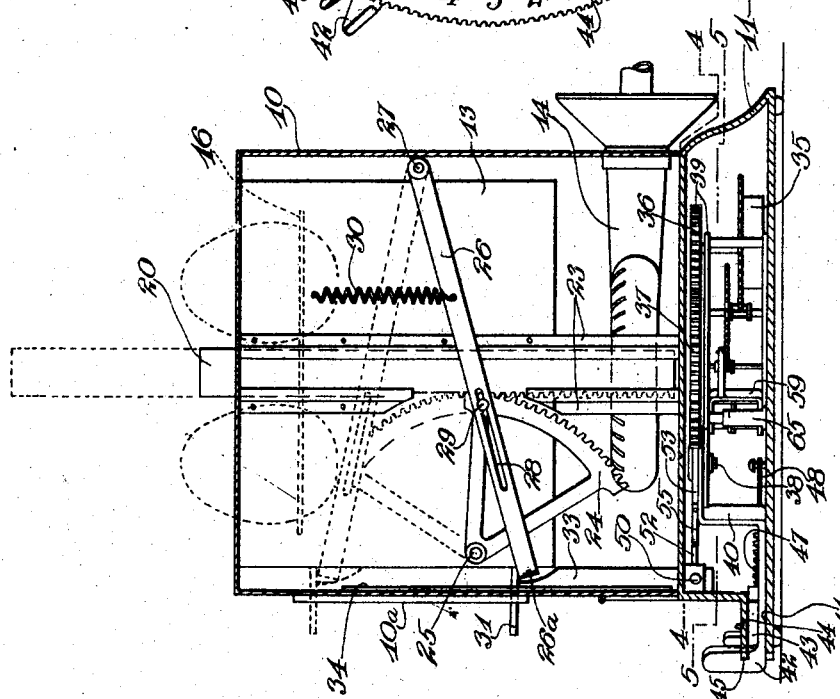

Patented June 30, 1931

1,812,266

UNITED STATES PATENT OFFICE

FREDERICK E. HUMMEL AND JOHN J. NOETH, OF CHICAGO, ILLINOIS

TIMING MECHANISM FOR EGG BOILERS AND THE LIKE

Application filed December 11, 1924, Serial No. 755,260. Renewed September 20, 1928.

This invention relates to egg boilers of the automatic type, such as are usually employed in restaurants or lunch rooms, and its object is to provide a boiler of this type which is self contained and compact.

Another object of the invention is to provide a boiler of this type which operates by a simple clockwork mechanism, which is easily controlled and dependable.

A further object of the invention is to provide an appliance of this kind which is portable and independent, and fired by gas or electricity, being ready for operation at any place where a fuel main is available, whereby it may also be readily adapted for household use.

A still further object of the invention is to provide it with a handy attachment for the poaching of eggs and thus bring out a new and unique article of manufacture, which is nevertheless simple in construction and may be sold at a low figure.

With the above objects in view, and others that may suggest themselves hereinafter, the appliance embodies a novel combination and arrangement of parts to be presently described and claimed, reference being had to the accompanying drawings, in which Figure 1 is an elevation of the appliance, partly cut away;

Fig. 2 is a plan view, also partly in section;

Fig. 3 is a vertical section on the line 3—3 of Fig. 2;

Fig. 4 is a horizontal section on the line 4—4 of Fig. 3;

Figure 5:
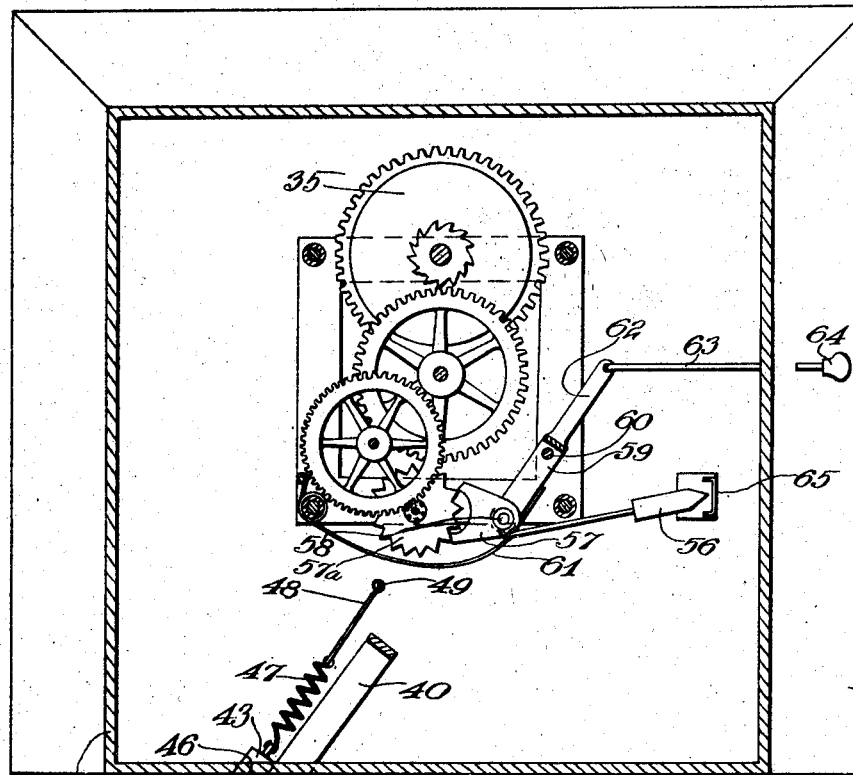
Fig. 5 is an enlarged section on the line 5—5 of Fig. 3.
Figure 6:
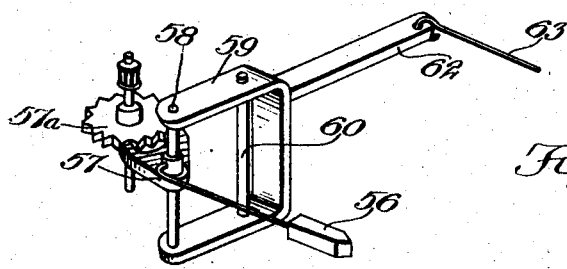
Fig. 6 is a perspective view of a detail.

Referring specifically to the drawings, 10 denotes the casing of the novel boiler, the same being preferably rectangular in form and supplemented by a flared base 11, which is the housing for the mechanism. The device is preferably constructed of heavy sheet metal, although a casting may be used for the base for better stability, if desired.

The top of the casing is formed with an inward rim 12 from which is dropped a trough 13 similar in form to the casing and designed to serve as the water receptacle or boiler proper. Under the latter, the casing receives a standard gas burner 14, to which access is had from the front of the casing by a hinged door which has a glass sight 15, so that the burner may be readily lighted or watched.

Within the boiler 13 is shown a tray 16 immersed in water and cut with holes 17 to receive four eggs, as indicated. This tray is formed with upward bends 18 on opposite sides whereby it may be liftd out of or lowered into the water. The tray is necessarily of openwork construction to facilitate its rise or descent through the water, and it is made with two special apertures 19 to seat and locate a suitable vessel (not shown) peculiar to the poaching of eggs, in case eggs are ordered poached instead of boiled.

Figure 1 indicates the position of the tray 16 and its charge during the boiling operation, and finely-dotted lines in Figure 3 indicate the position thereof at the end of a predetermined boiling period, the eggs now being readily accessible for removal with the fingers or a pair of tongs. The mechanism controlling the operation of the tray in the above manner utilizes primarily a pair of vertical gear-racks 20 to whose upper ends are attached the tray bends 18, as shown at 21. These racks are dropped through slots 22 in the casing rim 12 to lie next outside the boiler 13 in a position to slide in vertical guides 23 carried by the boiler wall. One edge of each rack 22 is cut with gear teeth, and the corresponding guide 23 is cut away thereat to permit the meshing with the rack of a gear sector 24 which is pivoted to the boiler wall as indicated at 25. The sweep of the two gear sectors 24 therefore operates the racks 22, the sectors themselves being raised by a pair of side bars 26. These are pivoted at one end to a common shaft 27 and are slotted intermediately at 28 to receive a wrist-pin 29 from each gear sector 24. The side bars 26 are united at the front to form a crosspiece 26a which is used as an abutment to depress the side bars against the tension of a coil spring 30 depending from the boiler wall to each bar. The actuator inducing this action is a finger piece 31 handily located at the front of the appliance, this finger piece passing through a vertical slot 32 in the front wall of the casing 10—which may be reinforced by a plate 10a—and seating on the crosspiece 26a as indicated in Figure 3. The finger piece has a depending hook bar 33 which has for one of its objects to steady the motion of the finger piece in the slot 32 through the co-operation of guide-ribs 34 inside the frontal casing wall. Finely-dotted lines in Figure 3 show the mechanism just described in released position, corresponding to the termination of the boiling operation.

In order to make the operation of the appliance automatic, whereby the eggs may be raised out of the boiling water after a predetermined period without anyone's attention, a unique clockwork mechanism is employed and will now be described.

The clockwork mechanism referred to is contained in the base 11 of the appliance, and consists mainly of a spring motor 35 wound by an external gear 36. The latter is operated by a sector gear 37 pivoted at 38 on the top plate 39 of the motor and having a lever extension 40 beyond the pivot. Full lines in Figure 4 indicate that the sector gear 37 is in a position where it has fully wound the motor; and finely dotted lines indicate the opposite extreme.

The lever extension 40 of the sector gear 37 drops to the bottom of the base 11 and passes through a wide slot 41 in the front wall of the same to be fashioned into a handle 42. The lever is designed to swing through this slot from its right-hand end toward the left-hand end when to wind the motor, the sweep being limited by a stop 43. This stop is a lug positioned laterally of the lever extension 40 between the bottom of the base 11 and a segment-shaped ledge 44 forming the top of the slot 41. The base bottom is cut to match the contour of the ledge, and both are cut with a series of registering notches 45 into a selected pair of which a stud 46 passing through the stop 43 is receivable. To favor such a setting, the stop is drawn inwardly by a spring 47 anchored by a wire 48 to a bottom stud 49 at a central point inside the housing 11. By means of a handle bend 43a of the stop 43, the latter may be drawn out slightly to release it from a given pair of notches 45 and moved to a different pair, whereby the sweep of the lever extension 40 and in turn the extent of winding the motor are regulated. With the segment-ledge 44 graduated to correlate given notches with periods of time for the boiling of eggs, it will be seen that the stop 43 will serve as a simple indicator to limit the activity of the motor mechanism to any predetermined period of time.

The automatic connection between the motor and egg tray operating mechanism will now be described. The hook bar 33 previously considered as allied with the egg tray actuator descends into the base 11, and is cut with a side notch 33a before it is tapered to form its lower extremity. Adjacent to the latter the frontal base wall carries a sliding latch bolt 50 advanced by a spring 51 to seat in the notch 33a of the hook bar 33 and thus hold the latter down. The latch bolt has a side pin 52 in the path of a finger 53 carried by the sector gear 37 whereby the travel of the latter to finely-dotted position of Figure 4 will cause the finger 53 to strike the pin 52, thus backing the latch bolt 50, and wipe past the pin, as also indicated by finely-dotted lines. The finger 53 has a knuckle-joint pivot 54, maintained by a leaf spring 55, whereby the finger may break on the return sweep to clear the pin 52.

To operate the device, the burner 14 should first be in operation and a suitable level of boiling water had in the boiler 13. The eggs are then deposited in the tray, which is now in elevated position, and the finger piece 31 depressed all the way down. This will cause the hook bar 33 to first crowd and then receive the latch bolt 50 in its notch 33a, whereby said hook bar is caught and the eggs located in immersed position. The handle 42 is now drawn to the left until it abuts the stop 43, previously stationed at a point corresponding to the number of minutes the eggs are to be boiled. This action does not of course affect the hold of the latch bolt 50 on the hook bar 33, since the finger 53 slips by the bolt pin 52 on the winding stroke, as previously indicated. When the handle 42 is released it immediately starts on its return stroke, due to the unwinding of the spring. The return stroke is, however, regulated by the effect of a governor 56 on the escapement 57 of the spring motor, whereby the return occurs at a predetermined rate. This rate is of course calculated in minutes to agree with the readings on the ledge 44, the governor being adjusted until the proper retarding effect is had on the escapement. When the handle 42 has returned to its point of origin the finger 53 will have impinged on the latch bolt 50 to release the vertical hook bar. The latter will immediately rise due to the pull of the springs 30 on the parts 26, 26a allowing the eggs to be raised out of the water. Needless to say, the above operation will apply in the case of poached eggs as well; also, weights may be suitably used instead of the springs 30, and an electrical heating device instead of the gas burner, if desired.

Where the operation of the appliance has been started as described, but must be suddenly interrupted due to a mistake, a change in the order or some unexpected development, a device is provided to immediately release the spring motor by the simple push of a button. It will be noted that the escapement 57 is carried by a spindle 58 supported by a frame 59 pivoted on a post 60. A floor spring 61 normally presses the frame so as to urge the escapement against its wheel 57a. The frame 59 has an extension 62 beyond its pivot post 60 to which is linked a push rod 63, headed by a button 64 outside the casing 10 of the appliance at the right. It will be obvious that pressure on the button 64 will cause the escapement 57 to swing away from its wheel 57a, permitting the summary release of the spring and in turn the raising of the eggs out of the water by means already familiar.

The governor 56 is a weighted stem carried by the escapement 57, and when the latter recedes as last explained, the weight of the governor will advance into a flanged checkplate 65 which will confine it to prevent erratic vibration thereof with possible harm to the delicate escapement when the spring motor is suddenly caused to unwind as described.

An egg boiling or poaching appliance is thus had which is comparatively simple in construction, easy to operate and selfcontained, in that it is complete and ready for operation without any accessory other than the fuel connection. The device is portable and easy to place anywhere, making it easy to connect at any point without extra fittings or special installation. Its preferred square form enables it to accommodate the greatest number of eggs for its size, but it will be obvious that the form of the appliance may be changed without altering its usefulness.

While automatic egg boiling appliances have been entirely restricted to restaurant, lunch room or lunch counter use, it will be seen that the simple, compact and independent nature of our appliance opens a new field of usefulness for it, namely, the household. As previously mentioned, the appliance may be furnished with a gas burner as shown, or with a suitable electrical heating unit, controlled by a handy switch. The special vessel for the poaching of eggs would of course be furnished as an accessory to the appliance for handy deposit on the tray 16 when desired.

We claim:

A timing device for an egg-boiler, or the like comprising an elevator, a latch to detain the latter, a main sweep-arm normally driven in one direction and manually movable in the opposite direction, a graduated segmental ledge to guide and indicate the movement of the main sweep-arm, an accessory sweep-arm operative in advance of the main sweep-arm along said ledge, a stop carried by the accessory sweep-arm and adjustably engageable with said ledge to limit the manual stroke of the main sweep-arm, and a tripper for said latch carried by the main sweep-arm and operative on the driven stroke to effect the release of the latch.

In testimony whereof we affix our signatures.

FREDERICK E. HUMMEL.
JOHN J. NOETH.